(12) United States Patent
Jürs et al.

(10) Patent No.: US 7,927,194 B2
(45) Date of Patent: Apr. 19, 2011

(54) DEVICE FOR EXTRACTING THE FLANK BONES OF BEHEADED, SLAUGHTERED FISH HAVING OPEN ABDOMINAL CAVITIES AND FILLETING MACHINE FOR FILLETING BEHEADED, SLAUGHTERED FISH HAVING OPEN ABDOMINAL CAVITIES COMPRISING SUCH A DEVICE

(75) Inventors: Michael Jürs, Haffkrug (DE); Hans Finke, Lübeck (DE); Manfred Brandt, Lübeck (DE)

(73) Assignee: Nordischer Maschinenbau Rud. Baader GmbH & Co. KG, Lübeck (DE)

( * ) Notice: Subject to any disclaimer, the term of this patent is extended or adjusted under 35 U.S.C. 154(b) by 0 days.

(21) Appl. No.: 12/742,243

(22) PCT Filed: Oct. 30, 2008

(86) PCT No.: PCT/EP2008/009353
§ 371 (c)(1),
(2), (4) Date: May 10, 2010

(87) PCT Pub. No.: WO2009/059759
PCT Pub. Date: May 14, 2009

(65) Prior Publication Data
US 2010/0255767 A1    Oct. 7, 2010

(30) Foreign Application Priority Data
Nov. 9, 2007 (DE) .......................... 10 2007 053 905

(51) Int. Cl.
*A22C 17/00* (2006.01)
(52) U.S. Cl. ...................................... 452/135

(58) Field of Classification Search .................. 452/135, 452/160–163, 170
See application file for complete search history.

(56) References Cited

U.S. PATENT DOCUMENTS

| 2,381,560 | A | 8/1945 | Savrda |
| 3,309,730 | A | 3/1967 | Michael |
| 6,183,356 | B1 * | 2/2001 | Middleton et al. .............. 452/57 |
| 6,322,437 | B1 | 11/2001 | Grabau et al. |

(Continued)

FOREIGN PATENT DOCUMENTS
DE           943 612 C      5/1956

(Continued)

OTHER PUBLICATIONS

International Search Report (with translation) and Opinion for PCT/EP2008/009353, filed Oct. 30, 2008.

(Continued)

*Primary Examiner* — Thomas Price
(74) *Attorney, Agent, or Firm* — Venable LLP; Robert Kinberg (57) ABSTRACT

An apparatus to cut free flank bones of a beheaded, slaughtered fish having an open abdominal cavity includes a transport saddle to transport the fish in a direction of fish travel. The saddle includes an upper bone guide and a lower bone guide. The apparatus additionally includes a separating unit moveable back and forth from a standby position into a working position having a separating device and a counter support. The separating device includes a rotating circular knife to detach a fish fillet from the flank bones and the counter support includes a fixed element and is associated with the separating device. The counter support and separating device are movable about two axes, the fixed element being movable relative to the circular knife and independently thereof.

13 Claims, 7 Drawing Sheets

U.S. PATENT DOCUMENTS 6,769,976 B2 * 8/2004 Bass ............................... 452/62
7,220,177 B2 * 5/2007 King et al. ...................... 452/62
7,557,507 B2 * 7/2009 Wu et al. ........................ 313/584

FOREIGN PATENT DOCUMENTS

| DE | 1 454 087 A1 | 2/1969 |
| DE | 1 97 45 891 A1 | 4/1999 |
| DE | 198 81 497 C1 | 4/2003 |
| GB | 872801 | 12/1961 |
| WO | WO 02/03807 | 1/2002 |

OTHER PUBLICATIONS

International Search Report (with translation) and Opinion for PCT/EP2008/009351.

* cited by examiner

DEVICE FOR EXTRACTING THE FLANK BONES OF BEHEADED, SLAUGHTERED FISH HAVING OPEN ABDOMINAL CAVITIES AND FILLETING MACHINE FOR FILLETING BEHEADED, SLAUGHTERED FISH HAVING OPEN ABDOMINAL CAVITIES COMPRISING SUCH A DEVICE

CROSS-REFERENCE TO RELATED APPLICATIONS

This application is a National Stage Application of PCT/EP2008/009353, filed Oct. 30, 2008, which designates the United States and claims the priority of German patent application DE 10 2007 053 905.5, filed on Nov. 9, 2007, the subject matter of both of which are incorporated herein by reference by their entirety.

BACKGROUND

The invention concerns an apparatus for cutting free the flank bones of beheaded, slaughtered fish having open abdominal cavities which are transported on transport saddles, comprising an upper bone guide, a lower bone guide and a separating unit for detaching fish fillets from the flank bones, wherein the separating unit includes a separating means with corresponding counter support and can be moved out of a standby position into a working position and vice versa. Furthermore the invention concerns a filleting machine for filleting beheaded, slaughtered fish having open abdominal cavities, comprising dorsal knives for exposing the back spokes as far as the backbone, abdominal knives for exposing the belly spokes in the tail region as far as the backbone, an apparatus for cutting the flank bones free, separating knives for separating the fillets in the tail region from the backbone while cutting through the web left round the backbone by abdominal and dorsal knives, an endless conveyor for transport of the fish tail first, and a number of fish saddles arranged on the conveyor for reliably receiving the fish in their abdominal cavities.

Such apparatuses and filleting machines are used in the fish-processing industry to fillet fish automatically, in particular the salmon species. An essential working step in the automated filleting of fish is detaching the fillets from the flank bones, that is, the rib arches, which extend on both sides of the backbone. In the process the fish are transported by means of the transport saddles to the individual processing tools, inter alia the apparatus for cutting the flank bones free. The upper and lower bone guides serve to hold and guide the fish in the optimum processing position on the transport saddle. The separating unit is usually arranged on both sides of the fish to be processed, so that the fillets can be detached from the flank bones in parallel or with a time delay.

Detachment of the fillets from the flank bones takes place in the state of the art, which is formed e.g. by WO 02/03807 A1, by means of a scraping tool. In other words, the apparatus for cutting the flank bones free is formed by a scraping tool which is composed of scraping knives and scraping knife counter supports. Both the scraping knives and the scraping knife counter supports are fixed and, in addition to the capacity for vertical displacement, can also be swung out laterally. This known apparatus and hence also a filleting machine with such an apparatus have the drawback, however, that the cut surface is raw from the scraping detachment. Furthermore the possibilities of cutting guides are limited by the fixed scraping knives or scraping knife counter supports, so that the first flank bones sometimes remain in the fillet. This results in increased requirements for subsequent processing, leading to additional costs.

SUMMARY

It is therefore an object of the present invention to propose an apparatus and a method for cutting the flank bones free, which ensures an improved cut surface and individual cutting guides. Furthermore it is the object of the invention to propose a corresponding filleting machine.

According to one embodiment of the invention, there is provided an apparatus to cut free flank bones of a beheaded, slaughtered fish having an open abdominal cavity, comprising: a transport saddle to transport the fish in a direction of fish travel, the saddle including an upper bone guide and a lower bone guide; and a separating unit moveable back and forth from a standby position into a working position, the separating unit including: a separating device comprising a rotating circular knife to detach a fish fillet from the flank bones, and a counter support comprising a fixed element and associated with the separating device, the counter support and separating device each being movable about two axes, the fixed element being movable relative to the circular knife and independently thereof.

Objects of the invention may be achieved by an apparatus having the features mentioned hereinbefore by the fact that the separating means is a rotating circular knife and the counter support is a fixed element, both the circular knife and the element being pivotable about two axes, and the element being movable relative to the circular knife and independently thereof. The term "fixed" in connection with the counter support means that the counter support is indeed movable as a unit, e.g. pivotable, but by contrast with rotation of the circular knife does not perform an active cutting or separating movement such as e.g. rotation, oscillation or the like. Due to active cutting of the fillets from the flank bones by the rotating circular knife, a smooth cut surface is produced, wherein the positioning of the counter support relative to the circular knife assists this effect. In other words, the design according to the invention makes it possible for the counter support to be moved into an optimum position relative to the circular knife while the flank bones are cut free, so that a cut which is as smooth and perfect as possible takes place.

In an embodiment of the invention the fixed element may be sickle-shaped. The sickle-shaped or half-moon-shaped design serves to provide a cutting limit in a longer cutting region of the circular knife, that is, along a circular segment of the circular knife. Due to the linear provision or design of the counter support, in particular the cutting thickness can be altered over the cutting length.

Each circular knife and the corresponding counter support can have a common pivot axis and one further separate pivot axis, each. To put it another way, at least three pivot axes are provided. One pivot axis allows the apparatus or the unit consisting of circular knife and counter support to be pivoted up and down in general. A second pivot axis allows the circular knife to be moved towards and away from the bone guides. The third pivot axis allows the counter support to pivot towards and away from the bone guides. The movements of the second and third axes serve on the one hand to adjust in particular the cutting thickness. On the other hand the pivot movement about the second and third pivot axes allows a movement out of the standby position into the processing position and back.

Each counter support can have an additional pivot axis. Thus, each counter support is movable about a total of three pivot axes. As a result, in particular the cutting angle relative to the circular knife is variable. In other words, an X position relative to the circular knife can be obtained by the additional pivot movement.

In another embodiment of the invention the region of the lower bone guide can be formed recesses for receiving the counter supports as well as the circular knives. Hence the counter supports and the circular knives can stop in the standby position outside the region of transport of the fish, which, particularly when the tail region which leads in the direction of fish travel is guided over into the region of the circular knives, prevents the circular knives from penetrating the fish before the beginning of the flank bones in the direction of fish travel or from breaking up the fish in the flesh structure by guiding it over covering cover means. To put it another way, additional deflectors which would be arranged between the fish and the circular knives can be dispensed with.

The object may also be achieved by a filleting machine mentioned hereinbefore, which is distinguished in that the apparatus for cutting the flank bones free is designed according to any of claims 1 to 12. The resulting advantages have already been mentioned in connection with the apparatus for cutting them free, so that at this point reference is made to the corresponding passages, to avoid repetition.

BRIEF DESCRIPTION OF THE DRAWINGS

Further appropriate and/or advantageous features and embodiments are apparent from the subsidiary claims and the description. A particularly preferred embodiment is described in more detail with the aid of the attached drawings. The drawings show:

DETAILED DESCRIPTION

The apparatus shown serves to cut the flank bones free (hereinafter also referred to as the ribs) from beheaded, slaughtered salmon having open abdominal cavities, which are transported tail first in the direction of fish travel. The apparatus may, however, naturally also be used to detach the fillets from the ribs of other fish species. Also, use of fish which are transported headfirst in the direction of fish travel is possible.

With the apparatus 10 shown in FIGS. 1 to 6 for cutting the flank bones 11 free, for the sake of greater clarity only one apparatus 10 for processing one side of the fish is shown and described. In practice, however, the apparatuses 10 described below are located on both sides of a fish to be processed, so that the two fillets of a fish on both sides can be detached from the flank bones 11 preferably at the same time, but optionally also with a time delay. Alternatively, two apparatuses 10 arranged on opposite sides of a fish can also form a common apparatus 10, in which case processing on both sides can take place in synchronisation or independently of each other.

The apparatus 10 for cutting the flank bones 11 free comprises an upper bone guide 12, a lower bone guide 13 and a separating unit 14. By means of the bone guides 12, 13 the fish to be processed, which is usually transported on a transport saddle 15 into the region of the separating unit 14, is kept in a defined position such that the fish lies in a defined position in relation to the separating unit 14. The transport saddle 15 is described in more detail below. The separating unit 14 has a separating means 16 with which is associated a corresponding counter support 17. The separating unit 14 or the separating means 16 with the counter support 17 is movable out of a standby position (see e.g. FIG. 1) in which engagement of the separating means 16 in the fish is prevented, into a processing position (see FIGS. 3 and 5) in which the separating means 16 cuts the flank bones 11 free, and back.

The separating means 16 of the apparatus 10 is designed as a rotating circular knife 18 and can be driven in rotation at variable speed by means of a drive, not shown explicitly. The counter support 17 is a fixed element 19. The term "fixed" has already been defined or explained above, which is why repetition will be dispensed with at this point. The fixed element 19 is preferably sickle-shaped or half-moon-shaped and arranged in front of the circular knife 18 in the direction of fish travel (see arrow F). Both the circular knife 18 and the element 19 are pivotable about two axes, in order on the one hand to be movable out of the standby position into the processing position and back, and on the other hand to be able to perform the necessary cutting movements. For processing both sides of the fish, the separating means 16 can comprise two circular knives 18 with corresponding counter support 17, wherein the two circular knives 18 and the associated counter support 17 are arranged on opposite sides of the fish to be processed.

As already mentioned, each circular knife 18 and each element 19 is pivotable about at least two pivot axes. A circular knife 18 and an element 19 of one processing side have a common pivot axis I. Due to the movement about the common pivot axis I, the circular knife 18 and the element 19 are movable up and down in relation to the plane of transport of the fish. Furthermore, the circular knife 18 is movable about a pivot axis II by means of which the circular knife 18 is movable towards and away from the bone guides 12, 13, that is, transversely to the direction of fish travel. The element 19 is movable about a pivot axis III independent of the pivot axis II. Due to the movement about the pivot axis III, the element 19 is movable towards and away from the bone guides 12, 13, that is, transversely to the direction of fish travel. The pivot axes II and III also allow a movement of circular knife 18 and element 19 relative to each other. Optionally, the element 19 has a further, additional pivot axis IV. By means of a movement about the pivot axis IV, the element 19 is also movable towards and away from the bone guides 12, 13, that is, transversely to the direction of fish travel. The pivot movements of the element 19 about the pivot axes III and IV can be superimposed on each other like the movements about the other pivot axes.

The counter support 17 or the element 19 is operatively connected to an adjusting element 20. To put it another way, the element 19 is assigned an adjusting element 20 by means of which the element 19 is displaceable particularly in relation to the circular knife 18 for adjusting a cutting angle and/or the cutting thickness. The adjusting element 20 comprises a stop element 21 which has two stops 21a and 21b and is operatively connected to adjusting screws 22, 23. Instead of the adjusting screws 22, 23, other adjusting members can be used. Furthermore, the adjusting element 20 comprises a supporting element 24. The supporting element 24 and the stop element 21 have a common pivot axis, namely the pivot axis IV. In other words, both the stop element 21 and the supporting element 24 are pivotable about the pivot axis IV.

On the supporting element 24, which at a free end 25 is connected to the element 19, are arranged the adjusting screws 22, 23 or the like. The supporting element 24 and the stop element 21 are seated on a common shaft 26 which forms the pivot axis IV. The supporting element 24 or the stop element 21 is assigned an actuating element 27. The actuating element 27 is for example a pneumatic cylinder 28 which is attached on the one hand by a support frame 29 to the supporting element 24 and on the other hand to the stop element 21. But the arrangement and design of the actuating element 27 can be realized in a different manner. By means of the actuating element 27 the pivot movement about the pivot axis IV can be achieved.

In the region of the lower bone guide 13 are formed recesses 30, 31 for receiving the circular knife 18 and the element 19. The recess 30 is adapted to the contour of the circular knife 18 and has a depth which allows the circular knife 18 to lie completely within the bone guide 13. "Completely" refers to the fact that the circular knife 18 in the standby position lies in the bone guide 13 in such a way that it does not protrude beyond the bone guide 12 transversely to the direction of fish travel. The recess 31 is adapted to the sickle shape of the element 19 and also designed in depth in such a way that the element 19 in the standby position lies correspondingly completely within the bone guide 13. However, the design of the recesses 30, 31 may of course vary.

Figure 7:
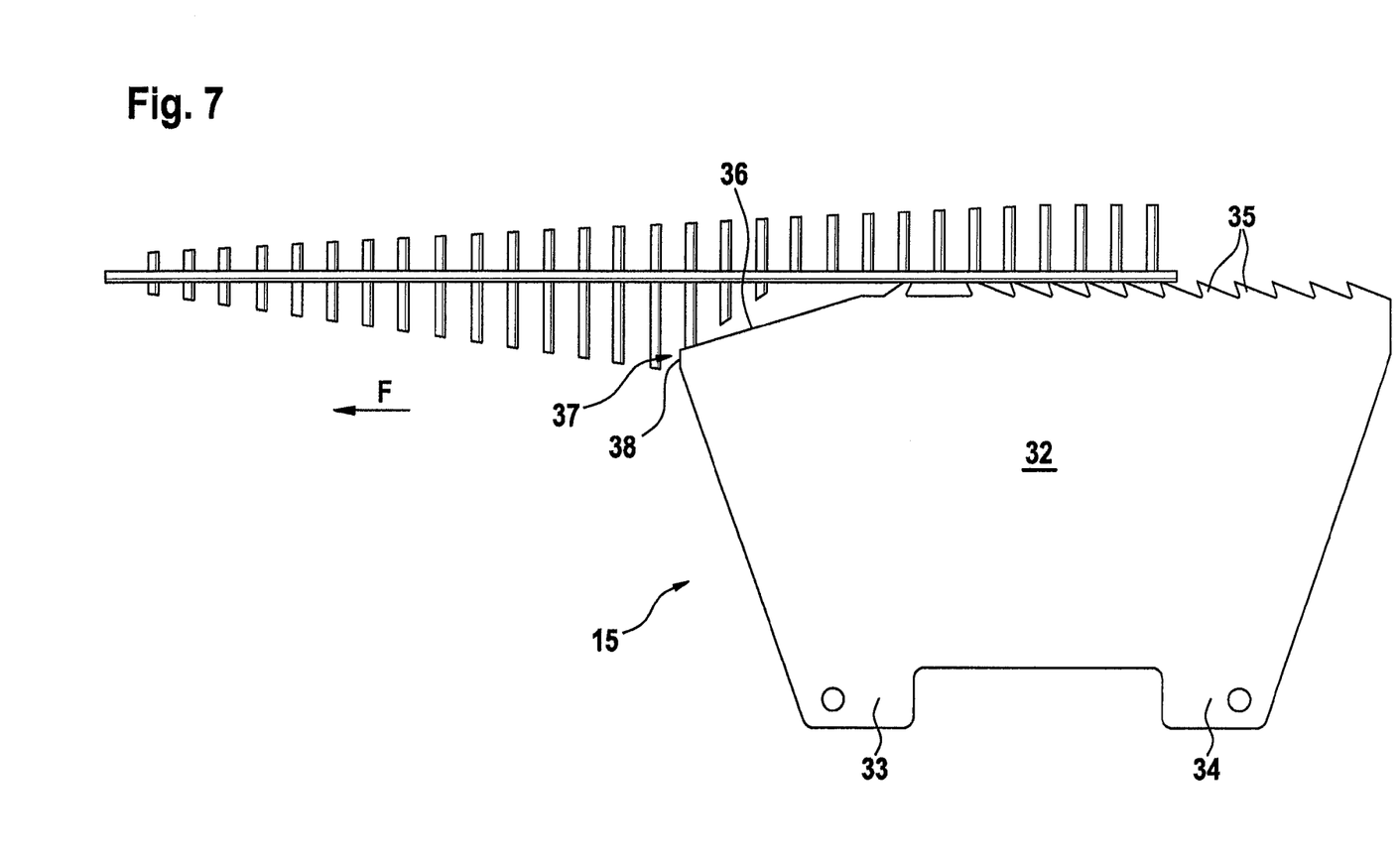
FIG. 7 is a side view of an embodiment of the transport saddle, indicating the bone structure.

In FIG. 7 the transport saddle 15 is shown on a larger scale. The transport saddle 15 is basically constructed in a conventional manner, namely with a saddle body 32 which is attached by means of supporting elements 33, 34 to an endlessly rotating transport chain (not shown). On the upper side facing towards the fish, the saddle body 32 has fixing elements 35 which are preferably designed as saw teeth. The fish is pushed onto the transport saddle 15 head region first, wherein the transport saddle 15 lies at least partially in the abdominal cavity. In the front region facing towards the fish, the transport saddle 15 or saddle body 32 slopes down, forming a slope 36, making it easier to thread the fish into/onto the transport saddle 15. The slope 36 is adjoined by a substantially vertically extending region 37 which forms a stop face 38. From the stop face 38, the saddle body 32 runs in the direction of the supporting elements 33. Due to the stop face 38, which butts against the end of the abdominal cavity located in the tail region of the fish when the fish is threaded on with its abdominal cavity open, the fish is positioned optimally.

Figure 1:
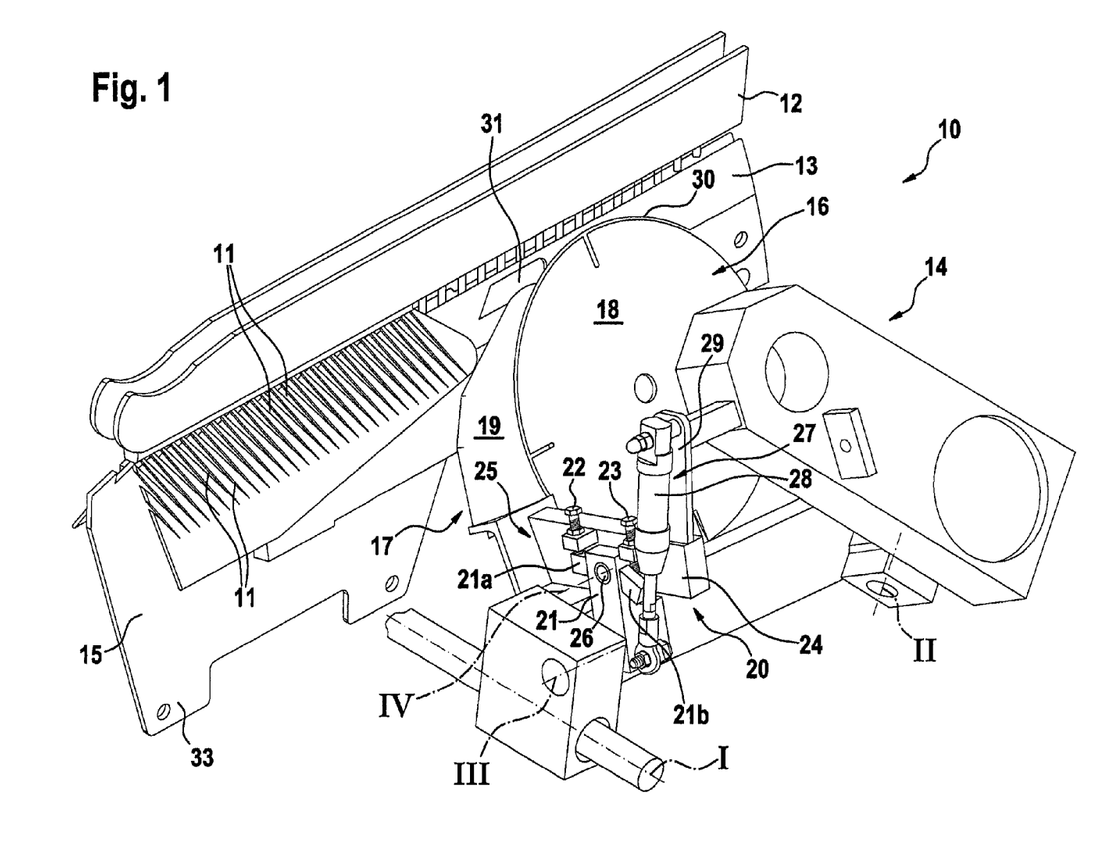
FIG. 1 is a perspective view of one embodiment of an apparatus according to the invention at a stage at which a fish encounters the circular knives.
Figure 2:
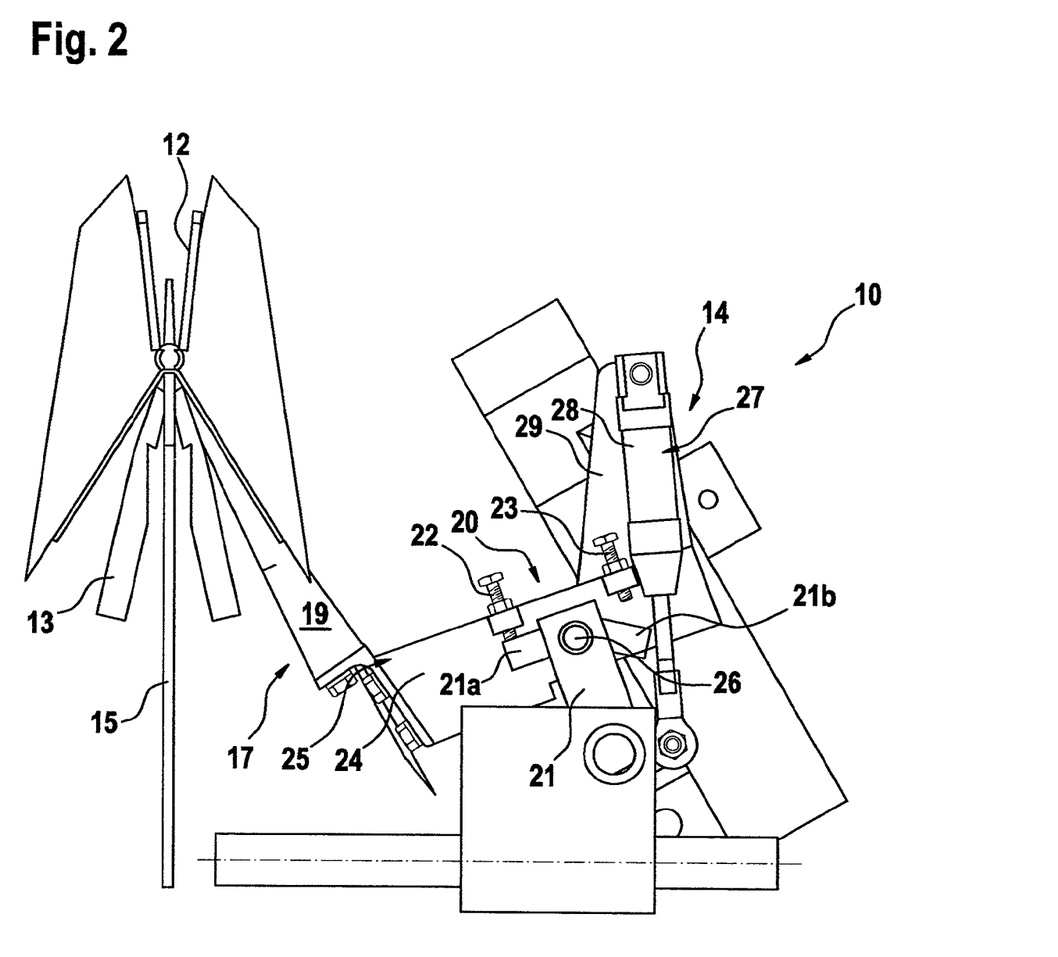
FIG. 2 is an embodiment of the apparatus according to FIG. 1 in a front view.
Figure 3:
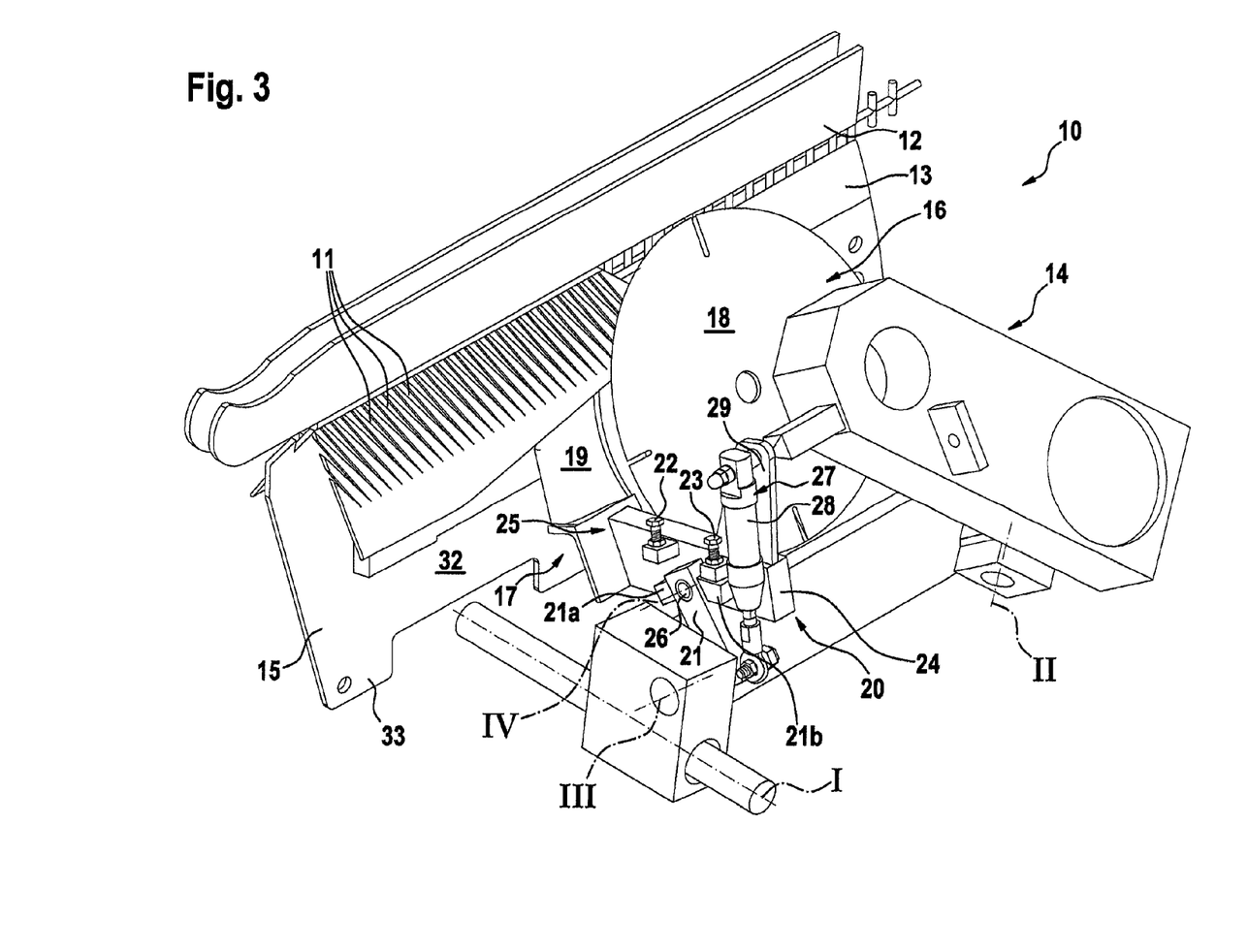
FIG. 3 is a perspective view of an embodiment of the apparatus according to the invention at a stage at which detachment of the fillets from the flank bones is beginning.
Figure 4:
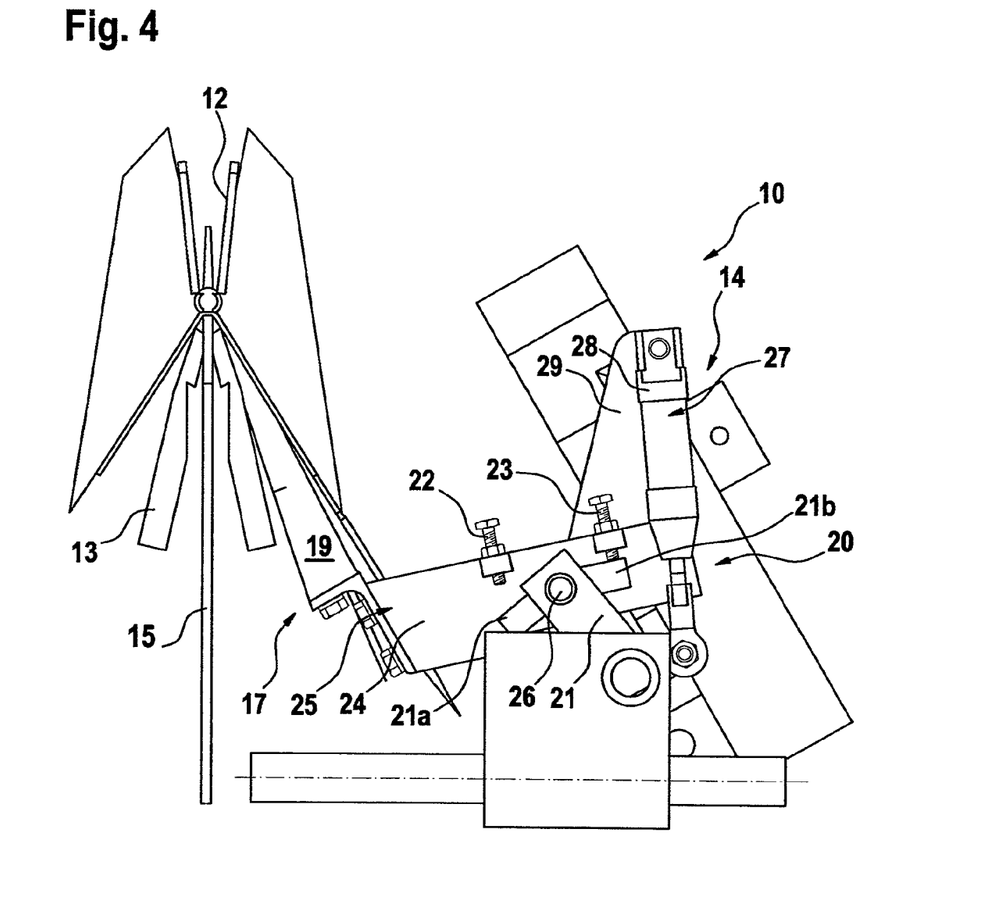
FIG. 4 is an embodiment of the apparatus according to FIG. 3 in a front view.
Figure 5:
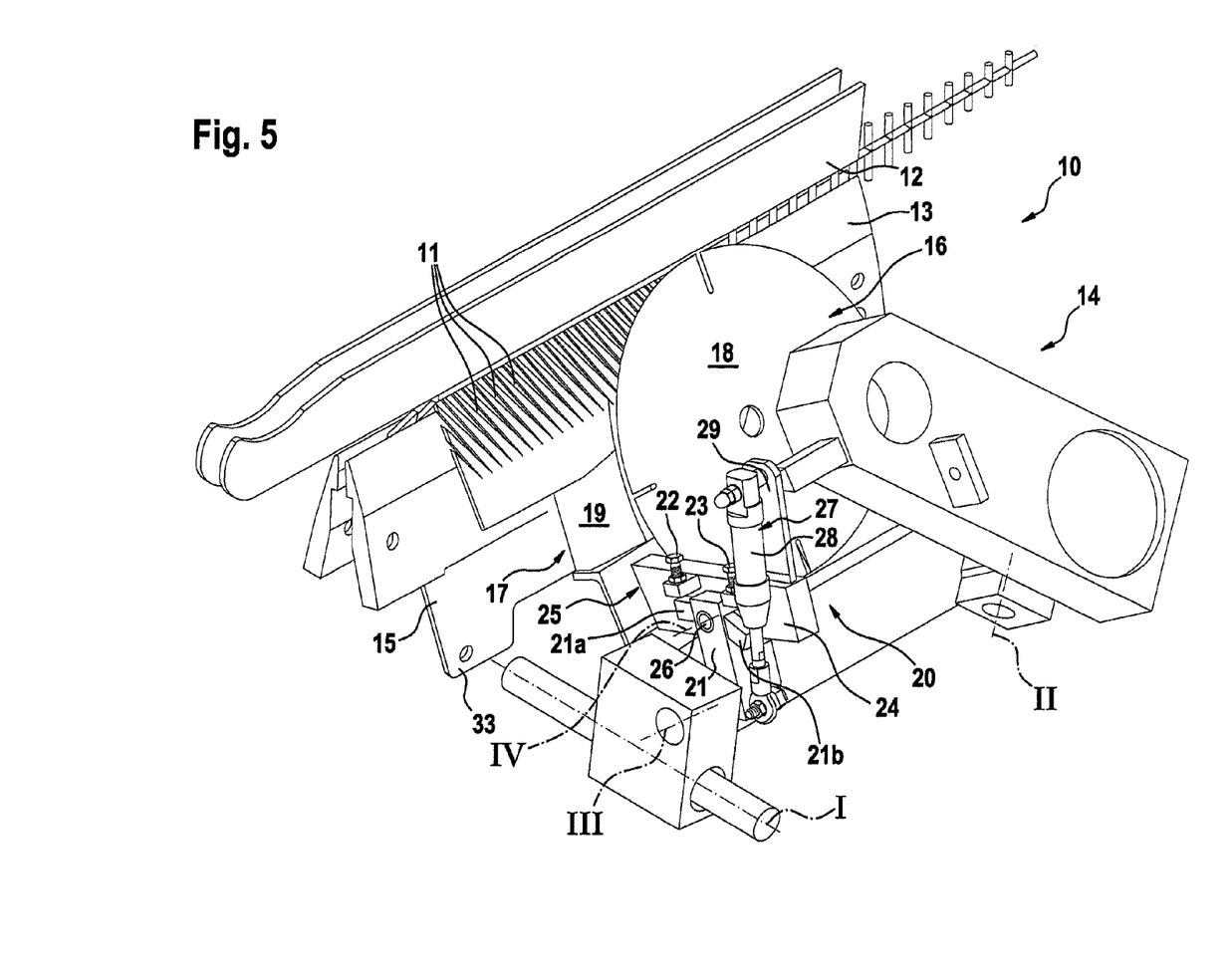
FIG. 5 is a perspective view of an embodiment of the apparatus according to the invention at a stage at which detachment of the fillets from the flank bones has progressed further.
Figure 6:
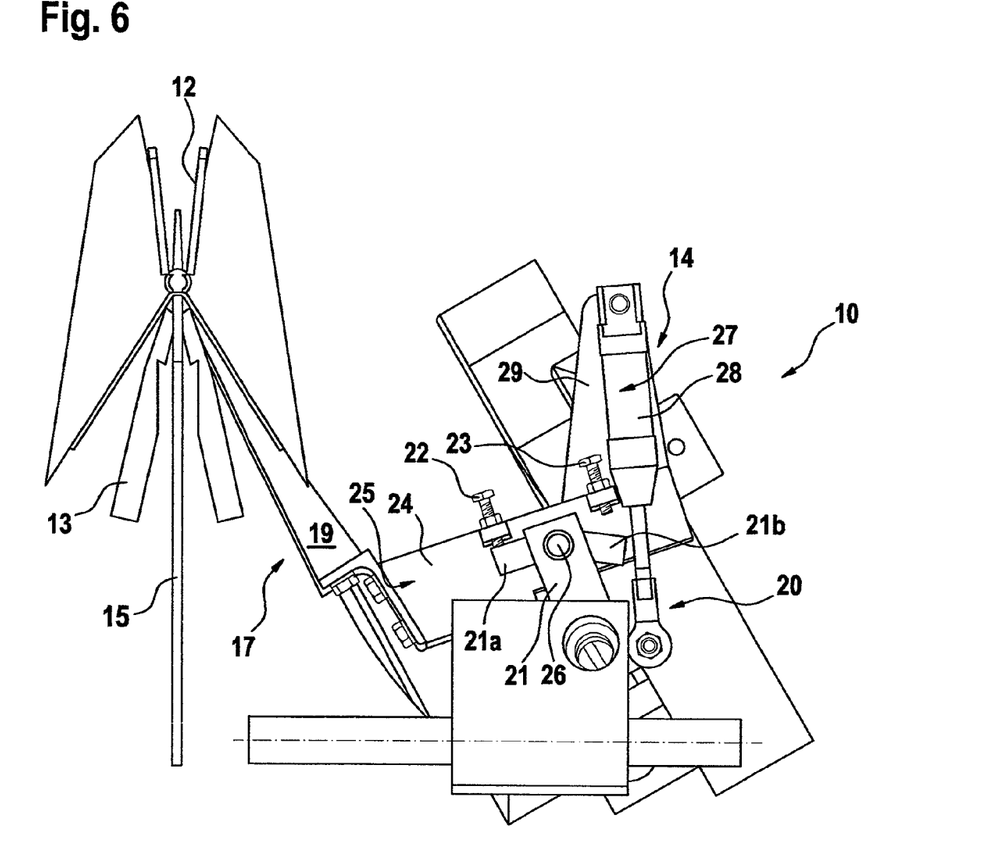
FIG. 6 is an embodiment of the apparatus according to FIG. 5 in a front view.

Below, the principle of the method is described in more detail in particular with the aid of the sequence of FIGS. 1, 3, 5.

The fish to be processed is beheaded and slaughtered before placing it on the transport saddle 15, so that the fish has its abdominal cavity open. Then the "headless" fish is pushed head region first in the direction opposite the direction of fish travel F (see FIG. 7) onto the transport saddle 15 until the stop face 38 of the transport saddle 15 encounters the end of the abdominal cavity. The fish positioned in this way is preferably transported tail first in the direction of fish travel through the filleting machine. The fish to be processed is transported on the transport saddle 15 inter alia into the region of the apparatus 10. To gently guide the tail region, which is leading in the direction of fish travel, the circular knife 18 and the element 19 are located in the standby position in the recesses 30, 31 (see e.g. FIG. 1), so that the tail region can pass through the separating unit 14 without impairment/damage. As soon as the region of the flank bones 11 is located just in front of the circular knife 18 in the direction of fish travel, the circular knife 18 is pivoted about the two pivot axes I and II out of the recess 30 and into the processing position. In parallel, the element 19 is pivoted correspondingly about the two pivot axes I and III (see FIG. 3). The size of the delivery or pivot movements can be chosen individually as a function of the fish size.

The element 19 abuts with its upper tip in the recess 31 against the lower bone guide 13. While the flank bones 11 are cut free, the element 19 is adjusted relative to the circular knife 18 in such a way that a smooth cut takes place. The position of the element 19 relative to the circular knife 18 can be varied in particular by activating the element 19 via the actuating element 27. To put it another way, by actuation of the actuating element 27 the angle of the element 19 relative to the circular knife 18 can be adjusted within a fixed range between the two stops 21a and 21b of the stop element 21. This results in different cutting angles and cutting thicknesses. A maximum or minimum cutting thickness is reached when the stops 21a, 21b butt against the adjusting screws 22, 23. Between the stops 21a, 21b the element 19 works against the selected air pressure of the cylinder 28 and so automatically adjusts the cutting thickness. As already mentioned, the circular knives 18 rotate to cut the fillets free. But there is also the possibility of varying the cutting speed of the circular knives 18 preferably after penetration of the fish, and in particular also reducing it. Even temporary stopping of the circular knives 18 while the fillets are cut free is possible. In such a case the circular knives 18 would act as a kind of scraping knife.

Due to adjustment of the stop screws or adjusting screws 22, 23, it can further be determined whether the membrane (white belly skin) is to remain on the fillet, or whether the membrane is to be separated from the fillet. With salmon, the membrane is for example located at the lower edge of the abdominal cavity. In case of the adjustment of the adjusting screws 22, 23 set in FIGS. 3 and 5, the membrane is separated from the fillet and remains on the flank bones 11. The adjustment of the cutting angles and cutting thickness can be varied while cutting free, so that e.g. the gap between circular knife 18 and element 19 is greater at the beginning of the abdominal cavity than in the middle or at the end of the abdominal cavity. As a result the flank bones 11 can more easily pass between the element 19 and the circular knife 18.

The invention claimed is:

1. An apparatus to cut free flank bones of a beheaded, slaughtered fish having an open abdominal cavity, comprising:
  a transport saddle to transport the fish in a direction of fish travel, the saddle including an upper bone guide and a lower bone guide; and
  a separating unit moveable back and forth from a standby position into a working position, the separating unit including:
    a separating device comprising a rotating circular knife to detach a fish fillet from the flank bones, and
    a counter support comprising a fixed element and associated with the separating device, the counter support and separating device each being movable about two axes, the fixed element being movable relative to the circular knife and independently thereof.

2. The apparatus according to claim 1, wherein the separating unit includes a second rotating circular knife and a second counter support associated with the second circular knife, wherein the rotating circular knife with the counter support and the second rotating circular knife with the second counter support are arranged on opposite sides of the fish.

3. The apparatus according to claim 1, wherein the fixed element comprises a sickleshape.

4. The apparatus according to claim 1, wherein the circular knife and the fixed element have a common pivot axis and at least one separate pivot axis respectively.

5. The apparatus according to claim 4, wherein the counter support includes an additional pivot axis.

6. The apparatus according to claim 1, further comprising an adjusting element operatively coupled to the counter support.

7. The apparatus according to claim 6, wherein the adjusting element comprises a stop element and adjusting screws, wherein the stop element is operatively coupled to the adjusting screws.

8. The apparatus according to claim 7, wherein the adjusting element further comprises a support element to support the counter support and the adjusting screws.

9. The apparatus according to claim 7, further comprising an actuating element to actuate the stop element.

10. The apparatus according to claim 9, wherein the adjusting element further comprises a support element to support both the counter support and the adjusting screws and the actuating element comprises a pneumatic cylinder coupled to the support element and the stop element.

11. The apparatus according to claim 1, wherein the lower bone guide has a lower region including first and second recesses to receive the fixed element and the circular knife, respectively.

12. The apparatus according to claim 11, wherein the circular knife and the fixed element lie completely within the first and second recesses of the lower bone guide when the separating unit is in the standby position.

13. A filleting machine for filleting a beheaded, slaughtered fish having an open abdominal cavity, comprising:
    a dorsal knife to expose back spokes of the fish as far as a backbone of the fish;
    an abdominal knife to expose belly spokes of the fish in a tail region as far as the fish backbone;
    an apparatus to cut away flank bones of the fish including
        an endless conveyor to transport the fish tail end first in a direction of fish travel,
        a transport saddle arranged on the endless conveyor to receive the fish in the abdominal cavity of the fish, the saddle including an upper bone guide and a lower bone guide, and
    a separating unit moveable back and forth from a standby position into a working position, the separating unit including:
        a separating device comprising a rotating circular knife to detach a fish fillet from the flank bones, and
    a counter support comprising a fixed element and associated with the separating device, the counter support and separating device each being movable about two axes, the fixed element being movable relative to the circular knife and independently thereof; and
    a separating knife to separate the fillet attached to the backbone of the fish.

* * * * *